US011328052B2

(12) United States Patent
McKenzie et al.

(10) Patent No.: US 11,328,052 B2
(45) Date of Patent: May 10, 2022

(54) AUTOMATIC WORKSTATION FUNCTIONALITY MANAGEMENT BASED ON LOGIN CREDENTIALS

(71) Applicant: The Toronto-Dominion Bank, Toronto (CA)

(72) Inventors: Chad Philip McKenzie, London (CA); Benjamin James Dougall, London (CA); Lori-Anne Carley, London (CA)

(73) Assignee: The Toronto-Dominion Bank, Toronto (CA)

( * ) Notice: Subject to any disclaimer, the term of this patent is extended or adjusted under 35 U.S.C. 154(b) by 146 days.

(21) Appl. No.: 16/778,534

(22) Filed: Jan. 31, 2020

(65) Prior Publication Data

US 2021/0240812 A1    Aug. 5, 2021

(51) Int. Cl.
*H04L 29/06* (2006.01)
*G06F 21/44* (2013.01)
*G06F 21/62* (2013.01)

(52) U.S. Cl.
CPC .......... *G06F 21/44* (2013.01); *G06F 21/6218* (2013.01)

(58) Field of Classification Search
CPC .............................. G06F 21/44; G06F 21/6218
See application file for complete search history.

(56) References Cited

U.S. PATENT DOCUMENTS

| 5,428,683 A * | 6/1995 | Indeck | G06K 19/12 713/176 |
| 7,240,360 B1 * | 7/2007 | Phan | G06F 21/82 726/2 |
| 2010/0325097 A1 * | 12/2010 | Er | G06F 21/629 707/702 |

* cited by examiner

*Primary Examiner* — Jason K Gee
(74) *Attorney, Agent, or Firm* — Fish & Richardson P.C.

(57) ABSTRACT

The present disclosure involves systems, software, and computer implemented methods for automatically controlling access and limiting functionality of a computer workstation based on which user is currently logged in. In some implementations, an overwatch application is installed on the workstations to be controlled and monitored. If an authorized, but limited, user logs in, the overwatch application can initiate a lockdown process on the workstation. In some instances, the lockdown process is managed by a dedicated lockdown application, which is initiated or notified from the overwatch application, and which can initiate a lockdown of particular applications, functionality, and allowed interactions on the workstation until the limited user has completed their task and a new user logs in.

20 Claims, 4 Drawing Sheets

AUTOMATIC WORKSTATION FUNCTIONALITY MANAGEMENT BASED ON LOGIN CREDENTIALS

TECHNICAL FIELD

This disclosure generally relates to computer-implemented methods, software, and systems for automatically managing and adjusting the authorized functionality of a workstation based on the login credentials provided by a user.

BACKGROUND

Certain organizations have workstations that allow users a wide range of functionality. In some cases, it may be desirable to limit the workstation's functionality for specific users or groups of users. Different user logins can be used to determine authorized access to the system and which data and applications can be used or viewed.

SUMMARY

The present disclosure involves systems, software, and computer implemented methods for automatically controlling access and limiting functionality of a computer workstation based on which user is currently logged in. In some implementations, an overwatch application is installed on the workstations to be controlled and monitored. If an authorized, but limited, user logs in, the overwatch application can initiate a lockdown process on the workstation. In some instances, the lockdown process is managed by a dedicated lockdown application, which is initiated or notified from the overwatch application, and which can initiate a lockdown of particular applications, functionality, and allowed interactions on the workstation until the limited user has completed their task and a new user logs in.

An example system includes a communications interface, at least one memory storing a repository of login credentials, a repository of authorization rules and instructions, and at least one hardware processor interoperably coupled with the at least one memory the communications interface. The at least one processor can execute the instructions which cause the system to execute an overwatch application with a workstation that monitors logins to the workstation. In response to the overwatch application detecting an attempted login that is associated with a set of credentials, where the set of credentials correspond to a limited user, the overwatch application can initialize a lockdown application. The lockdown application can identify, based on the authorization rules and the set of credentials, authorized processes that are software processes permitted to execute on the workstation during the login of the limited user. The lockdown application can then terminate executing processes that are not authorized processes. The lockdown application can also identify a set of authorized hardware inputs based on the authorization rules and the set of credentials and monitor inputs associated with the workstation for the receipt of unauthorized hardware inputs to the workstation.

Implementations can optionally include one or more of the following features.

In some instances, in response to the lockdown application detecting an unauthorized hardware input, the lockdown application can suppress the unauthorized hardware input.

In some instances, in response to the lockdown application detecting an attempt to initiate a process that is not a software process, an alert to a central server is transmitted via a communications interface and a forced logout of the limited user is executed.

In some instance, the overwatch and lockdown applications are remotely installed on the workstation by a server system.

In some instances, a login attempt of a limited user includes receiving a set of credentials at the workstation, transmitting (via the communications interface) the set of credentials to a server system which verifies the credentials as the credentials of an authorized, but limited, user, and receiving (via the communications interface) a login authorization to the workstation that includes information associated with the authorization rules. The authorization rules being associated with the set of credentials that match stored credentials in the stored repository of login credentials.

In some instances, the limited user includes a system user that is authorized to perform a particular set of tasks, the tasks requiring only a subset of functionality associated with the workstation. The authorized processes correspond to the subset of functionality required by the particular set of tasks.

In some instances, the particular set of tasks includes refilling a cash dispenser associated with the workstation.

In some instance, in response to the overwatch application detecting an attempted login by an authorized user, the overwatch application allows full workstation functionality to the authorized user.

In some instances, the authorized user is a bank teller associated with the workstation, and the limited user is a cash recycler.

In some instances, the hardware inputs to the workstation include inputs from at least one of a keyboard, mouse, removable memory, cash register, touchscreen, or microphone.

Similar operations and processes may be performed in a different system comprising at least one processor and a memory communicatively coupled to the at least one processor where the memory stores instructions that, when executed, cause the at least one processor to perform the operations. Further, a non-transitory computer-readable medium storing instructions which, when executed, cause at least one processor to perform the operations may also be contemplated. Additionally, similar operations can be associated with or provided as computer-implemented software embodied on tangible, non-transitory media that processes and transforms the respective data; some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

This disclosure describes a system for automatically controlling access and limiting functionality of a computer workstation based on which user is currently logged in. In some implementations, an overwatch application is installed on the workstations to be controlled and monitored. The overwatch application can be installed locally (e.g., by a system administrator) or remotely (e.g., by a centralized server system). In some instances, the overwatch application can be a background process that monitors any attempt to login to a workstation, and subsequently assesses a received set of credentials provided by and associated with the person logging in during the attempt. Credentials can be provided via various means. For example, a user can input a username or password via text entry. In another example, credentials can be provided with an access card, which can be read via a card reader connected to the workstation and verified based on information stored on or associated with the access card. In yet another example, the workstation can obtain biometric information (e.g., fingerprint, iris image, facial recognition analysis, etc.) associated with a user and correlate the biometric information with a previously stored set of credentials.

When a login attempt is detected and credentials associated with a fully authorized user are provided, the overwatch application may not intervene or take further action, allowing the fully authorized user to login and access the workstation's full functionality, including access to connected and/or integrated peripherals associated with the workstation. In some instances, some or all routine or normal users of the workstation are limited users, and the connected and/or integrated peripherals are available to the users based on the particular user or type of user, with no single individual having full access to all workstation functionality. If the provided credentials are associated with an authorized, but limited, user, the overwatch application can initiate a lockdown process on the workstation. In some instances, the lockdown process is managed by a dedicated lockdown application, which is initiated or notified from the overwatch application, and which can initiate a lockdown of particular applications, functionality, and allowed interactions on the workstation until the limited user has completed their task and a new user logs in. The lockdown can include limited application interaction, limited inputs, and, in some cases, limited access to particular authorized peripherals, as well as disabling or intercepting and rejecting interactions with non-authorized peripherals.

To determine whether a user's credentials correspond to a fully or limited authorized user, the overwatch application accesses a database of stored credentials, which may be stored at the workstation or centrally located at a server or cloud-based system, where obtained credentials are shared over a network by transmitting a message from the workstation to the backend system for verification. Based on the credentials and confirming the identity of the user, the corresponding allowed applications, peripherals, and other operations can be identified within the database and can be applied by the overwatch application and the lockdown process.

The lockdown process or application performs a number of operations which limit the functionality of the workstation on which it is executing or managing. The lockdown application can monitor executing software processes on the workstation and, in some instances, can terminate processes that are not authorized for the current user. In doing so, further interactions with those non-authorized processes can be avoided and accidental access can be prevented. In some instances, an authorized process database associated with each user (or in some cases, each user role and/or organization) stores a "whitelist" of authorized processes, and the lockdown application will terminate any process that is executing on the system and is not included on the whitelist. In some implementations, the whitelist, or list of authorized processes, can be based on the particular credentials provided. For example, a first limited user may have authorized access to a spreadsheet application, while a second limited user may not. In some implementations, the authorized process database is stored locally on the workstation, while in others the authorized process database is stored on a remote server system. In those instances, the lockdown application can receive a whitelist from the server system during the lockdown application's start up, the whitelist specific to the particular credentials provided. While the lockdown application is active and operating, the lockdown application can terminate unauthorized software processes that are requested, initiated, or are otherwise operating when a limited user logs in and is not associated with authorization for such processes. In some implementations, the lockdown application may also initiate and/or transmit an alert message to a remote system or other authority to notify a system administrator that an unauthorized software process was attempting to run or was initiated in a system while a limited user was logged in. In some implementations, further restrictions caused by the lockdown application can include shutting down the workstation, logging the limited user out, freezing operations being performed in otherwise authorized applications, recording the system state, and/or report additional details regarding the possible security breach, among others.

In some instances, the lockdown application can, in addition to limiting the software executing on the workstation, control or limit hardware operations and allowed inputs associated with the workstation. As an example, the lockdown application can monitor hardware inputs received and identify those that are not authorized. For example, if a limited user is logged in, the lockdown application may identify an ALT+TAB input from a keyboard, and, instead of switching windows as the input usually causes, the lockdown process can cause the input to be ignored. In another example, the lockdown application may ignore all keyboard inputs when a limited user is logged in, particularly where the authorized actions allowed to the limited user do not involve the keyboard. Alternatively, the lockdown application may prohibit or intercept all communication with hardware peripherals connected to the workstation. For example, the lockdown application may block any communication between the workstation and one or more universal serial bus (USB) ports, preventing a user from connecting new hardware (e.g., a USB thumb drive, or USB mouse), even when that new hardware is plugged into the workstation. Similarly, communication to existing hardware connected to the workstation at the time of the login can be terminated or suspended during the interaction of the limited user. Still further, hardware powered by the workstation may be disconnected or otherwise not provided power when that connection and hardware usage is not allowed. This can include connections to printers, mice, keyboards, USB drives, monitors, particular network connections, and others.

A server system can assist in maintenance and reporting of the system. The server system can be one or more servers in a local area network (LAN), or can be a remote or cloud-based system. In some implementations, the server system maintains a database of workstations with the overwatch and lockdown applications installed, including which versions are installed. The server system can push updates or new versions of both the overwatch application and lockdown application to workstations, as needed, to ensure the operations of both are up-to-date. In some implementations, the server system can refuse to service workstations that have out-of-date software, effectively forcing the workstation to request an update. For example, if a workstation has an outdated version of the overwatch software, when a user attempts to login, the server system can refuse to authenticate login credentials until the workstation has updated its overwatch software. The server system can also provide a reporting service, which can receive alerts or security breach information from workstations as well as other information (e.g., user login/logout times, operations conducted, etc.).

In one example implementation, a bank or financial institution can have a number of workstations that tellers use to perform financial transactions. The workstations can have and/or be connected to a keyboard, screen, card reader, and cash register connected as hardware peripherals in a wired, wireless, or integral manner. During normal operations, the bank tellers may be fully authorized users and have access to the full functionality and applications of the workstation. In this example, if a third party vendor is used to load or unload the registers following each workday, then that third party vendor may be defined as a limited user. When accessing the workstation to perform his or her tasks, the vendor may be able to provide their own or a vendor-specific set of credentials to particular workstations (e.g., by swiping an ID card in the card reader, using a vendor username/ password combination, etc.), and access some limited functionality of the workstation, such as causing the cash register to open or close. In this example, the workstation may not display anything on the screen and may ignore any keyboard inputs except the inputs and displays required to open or close the register. In another example, an IT support tech may provide their credentials and be provided access to some or all of the software functionality of the workstation, but may, however, be unable to open or close the register. In some instances, even the tellers may be limited users in that they may not have access to particular processes and applications not authorized for their execution.

Figure 1:
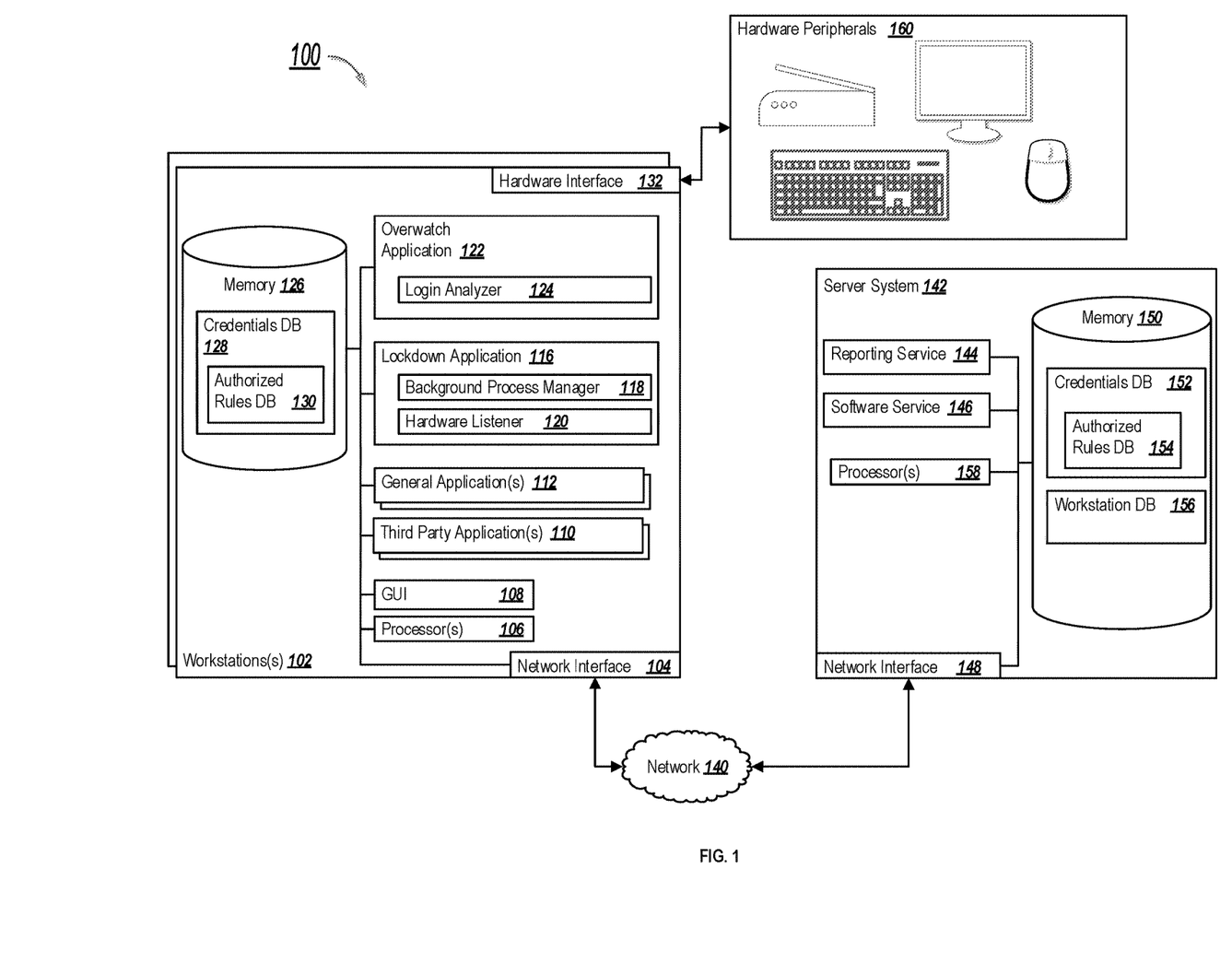
FIG. 1 depicts a block diagram of a system for monitoring and restricting workstation access based on login credentials.

Turning to the illustrated example implementation, FIG. 1 is a block diagram illustrating an example system 100 for monitoring and restricting workstation access based on login credentials. The system 100 includes one or more workstations 102 and a server system 142. It is noted that the server system 142, while depicted as a single system, can be multiple systems or a combined system installed in a workstation 102.

Workstation 102 can be a computing device with multiple functionalities that are to be controlled or limited based on a determination of a current logged in user. As illustrated, the workstation 102 includes a network interface 104, one or more processors 106, a memory 126, a graphical user interface (GUI) 108, one or more third party applications 110, one or more general applications 112, a lockdown application 116, an overwatch application 122, a memory 126, and a hardware interface 132.

The network interface 104 is used by the workstation 102 for communicating with other systems in a distributed environment, including within the system 100, connected to the network 140, e.g., server system 142, and other systems communicably coupled to the illustrated workstation 102 and/or network 140. Generally, the network interface 104 comprises logic encoded in software and/or hardware in a suitable combination and operable to communicate with the network 140 and other components. More specifically, the network interface 104 can comprise software supporting one or more communication protocols associated with communications such that the network 140 and/or network interface's 104 hardware is operable to communicate physical signals within and outside of the illustrated system 100. Still further, the network interface 104 can allow the workstation 102 to communicate with the server system 142 and/or other portions illustrated within the workstation 102 to perform the operations described herein.

The hardware interface 132 is used by the workstation 102 for communicating with hardware peripherals (e.g., hardware peripherals 160) that may be connected to the workstation (e.g., keyboard, mouse, joystick, display, audio device, microphone, cash register, touchscreen, or other USB device). Generally, the hardware interface 132 comprises logic encoded in software, firmware, and/or hardware in a suitable combination and operable to communicate with the hardware peripherals 160 and other components. The hardware interface 132 can include a wired communication interface (e.g., USB, Ethernet, fiber optic) or wireless communication interface (e.g., Bluetooth, ZigBee, WiFi, infrared (IR), CDMA2000, etc.). The hardware interface 132 can be used to communicate directly or indirectly, e.g., through a network, with the hardware peripherals 160. More specifically, the hardware interface 132 can comprise software and/or firmware supporting one or more communication protocols associated with communications such that the hardware peripherals 160 are operable to communicate physical signals within and outside of the workstation 102.

The workstation 102 includes one or more processors 106. Although illustrated as a single processor 106 in FIG. 1, multiple processors can be used according to particular needs, desires, or particular implementations of the system 100. Each processor 106 can be a central processing unit (CPU), an application specific integrated circuit (ASIC), a field-programmable gate array (FPGA), or another suitable component. Generally, the processor 106 executes instructions and manipulates data to perform the operations of the workstation 102. Specifically, the processor 106 executes the algorithms and operations described in the illustrated figures, as well as the various software modules and functionality, including the functionality for sending communications to and receiving transmissions from network 140, as well as to other devices and systems. Each processor 106 can have a single or multiple core, with each core available to host and execute an individual processing thread. Further, the number of, types of, and particular processors 106 used to execute the operations described herein can be dynamically determined based on a number of requests, interactions, and operations associated with the workstation 102.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component can be fully or partially written or described in any appropriate computer language including C, C++, JavaScript, Java™, Visual Basic, assembler, Perl®, any suitable version of 4GL, as well as others.

As illustrated, memory 126 can store information related to instructions for operating various applications (e.g., lockdown application 116 or third party applications 110), other information associated with operation of the workstation 102, data associated with one or more customers, data associated with one or more users (e.g., both fully authorized and limited users), as well as any other suitable information. In some instances, additional information from either the credentials database 128 and/or the authorized rule database 130 can be stored locally at memory 126 for use by the various applications (e.g., overwatch application 122 or general applications 112), or provided remotely at the server system 142 or another remote location, including network 140. Memory 126 of the workstation 102 can represent a single memory or multiple memories. The memory 126 can include any memory or database module and can take the form of volatile or non-volatile memory including, without limitation, magnetic media, optical media, random access memory (RAM), read-only memory (ROM), removable media, or any other suitable local or remote memory component. The memory 126 can store various objects or data, including financial data, user and/or account information, administrative settings, password and credential information, caches, applications, backup data, repositories storing business and/or dynamic information, and any other appropriate information associated with the workstation 102, including any parameters, variables, algorithms, instructions, rules, constraints, or references thereto. Additionally, the memory 126 can store any other appropriate data, such as VPN applications, firmware logs and policies, firewall policies, a security or access log, print or other reporting files, as well as others.

GUI 108 of the workstation 102 interfaces with at least a portion of the system 100 for any suitable purpose, including generating a visual representation of any particular general application 112, third party application 110, and/or the content associated with any components of the workstation 102 or server system 142. In particular, the GUI 108 can be used to present a current status of the lockdown application 116, alerts associated with actions taken by a user (e.g., including notifying the user, either limited or fully authorized, of their login status, and to otherwise interact and present information associated with one or more applications and/or operations of the workstation 102. GUI 108 can also be used to view and interact with various web pages, applications, and web services located local or external to the workstation 102. Generally, the GUI 108 provides the user with an efficient and user-friendly presentation of data provided by or communicated within the system 100. The GUI 108 can comprise a plurality of customizable frames or views having interactive fields, pull-down lists, and buttons operated by the user. In general, the GUI 108 is often configurable, supports a combination of tables and graphs (bar, line, pie, status dials, etc.), and is able to build real-time portals, application windows, and presentations. Therefore, the GUI 108 contemplates any suitable graphical user interface, such as a combination of a generic web browser, a web-enable application, intelligent engine, and command line interface (CLI) that processes information in the platform and efficiently presents the results to the user visually.

General applications 112 can be executed by the workstation 102. General applications 112 can be applications executed during normal operations of the workstation 102 (e.g., operating system, core components, etc.) or can be generic accessory applications installed on the workstation (e.g., MS Paint, a web browser, etc.).

Third party applications 110 can optionally be installed on the workstation 102, and can be identified by the lockdown application 116 as authorized. Third party applications 110 can be associated with a specific, limited task to be conducted by a limited user. For example, a system status check application may be installed as a third party application 110. In this example, if an IT specialist logs in as a limited user, the lockdown application 116 may only permit the execution of certain general applications 112 as authorized for the IT specialist, either personally or based on their role, and the system status check application (e.g., a third party application 110). Any other applications, except those needed to allow the workstation 102 to operate or that have been identified as critical applications by an administrator or other individual, are terminated, such that only the allowed or authorized applications, in addition to any system critical applications and processes, are allowed to execute. In some implementations, the workstation 102 does not have any third party applications 110 installed, and instead operates exclusively on general applications 112.

The overwatch application 122 can run as a background process regardless of whether a user is logged into the workstation 102. In some implementations, the overwatch application 122 is initialized at and runs after startup of the workstation 102. The overwatch application 122 can be installed on each workstation 102, either remotely by the server system 142 or individually by an IT professional or other user with installation authorization, and can be a lightweight application which uses a login analyzer 124 to monitor login attempts to the workstation 102. Although depicted in FIG. 1 as an application installed on the workstation 102, in some implementations, the overwatch application 122 can be installed in the server system 142 and monitor login attempts for a plurality of workstations. The login analyzer 124 receives any credentials inputted into the workstation 102 during a login attempt. Credentials can be, for example, a username and password, input received from an access card that have been read via a card reader connected to workstation 102 or biometric information (e.g., fingerprint, iris image, etc.) associated with a user.

The login analyzer 124 can then compare the received credentials with a credential database 128, which can be installed in memory 126, or at the server system 142. The credential database 128 can store a plurality of user accounts, each user account having an associated set of credentials. The credentials can be distinct to the individual (e.g., a username and password combination, or a set of particular biometric information) or can be associated with a group based on role (e.g., an administrator ID, or all maintenance techs share a password, etc.). Each set of credentials can also have an associated set of authorization rules stored in an authorization rules database 130. If the login analyzer 124 determines the received credentials match a set of credentials in the credentials database 128, the login analyzer 124 can then determine a set of authorization rules, or user limitations from the authorized rules database 130. The authorization rules can define which software processes are authorized, as well as which hardware inputs are authorized, for each particular set of credentials in the credentials database 128. In some implementations, the authorization rules database 130 defines software and hardware authorizations for groups of credentials based on a user role associated with each user. In response to the overwatch application 122 determining that credentials associated with a login belong to a limited user, the overwatch application 122 can initiate the execution of the lockdown application 116, which can then ensure that only those allowed and authorized applications remain executing, and, in some cases, instantiate applications specific to and required by the identity of the limited user (e.g., if the limited user only performs one task, then the lockdown application 116 can assist in opening the system to the particular application or operations associated with that task).

The lockdown application 116 includes a background process manager 118 and a hardware listener 120. The lockdown application can be initiated when login credentials are received that are associated with a limited user. The lockdown application 116 can access the authorized rules database 130 associated with a particular user and determine what software and hardware limitations and/or authorizations the limited user has, and can then place the workstation 102 in a condition of limited functionality based on them.

The background process manager 118 can monitor software processes that are executing on the workstation 102, and compare those processes with a whitelist of authorized software processes that is based on the authorized rules database 130 and the received login credentials. In some implementations, the whitelist is generated by a server system 142 based on user authorizations, roles, etc., and is then transmitted to the workstation 102 via the network 140. Alternatively, the whitelist can be generated at the local system based on available information. The background process manager 118 can terminate software processes that are not authorized software processes, ensuring the workstation 102 only executes operations within the scope of its limited functionality while the lockdown application 116 is running.

A hardware listener 120 can monitor and intercept inputs received by the hardware interface 132. Based on the provided credentials and the authorized rules database 130, certain hardware inputs can be blocked or ignored. For example, keyboard functionality can be limited (e.g., specific keypress combinations ignored) or entirely disabled. In another example, if the workstation 102 has a register connected, inputs commanding the register to open can be ignored or suppressed. In yet another example, hardware listener 120 can prevent additional devices from connecting to the workstation 102. In one such example, if a limited user is logged in and attempts to connect an unauthorized hardware device (e.g., a USB memory, thumb drive, etc.) the hardware listener 120 can intercept and/or block communications between the unauthorized hardware device and the workstation 102.

In some implementations, the lockdown application 116 can monitor for malicious, or unauthorized activity, and can respond accordingly. For example, if a limited user is logged in and has limited software application, but an unauthorized software process initiates, the lockdown application 116 can force log off the limited use, and freeze the workstation 102. In these implementations, the lockdown application may send an alert to the server system 142, or record a log of recent activity associated with the workstation and the credentials received.

Hardware peripherals 160 can include any physical device capable of communicating with the workstation 102. Hardware peripherals 160 can include, but are not limited to, keyboards, speakers, headsets, microphones, cash registers (remote locking drawers), touchscreens, internet of things (IoT) devices, removable memory, or other connected devices.

The server system 142 can be a back-end system that provides one or more services to one or more workstations 102. While depicted in FIG. 1 as a single server system 142, server system 142 can be multiple physical servers, and can be located in a local area network with the workstations 102 or can be remote from the workstation in a cloud based, or distributed implementation. The server system 142 can include a reporting service 144, a software service 146, one or more processors 158, a network interface 148, and a memory 150.

The network interface 148 can be similar to, or different from network interface 104, and generally includes logic encoded in software and/or hardware in a suitable combination and operable to communicate with the network 140 and other components. The processor(s) 158 can be similar to, or different from processor(s) 106, and generally executes instructions and manipulates data to perform the operations of the server system 142. Specifically, the processor 158 executes the algorithms and operations described in the illustrated figures, as well as the various software modules and functionality, including the functionality for sending communications to and receiving transmissions from network 140, as well as to other devices and systems. Memory 150 can be similar to, or different from memory 126, and generally stores various objects or data, including financial data, user and/or account information, administrative settings, password information, caches, applications, backup data, repositories storing business and/or dynamic information, and other appropriate information associated with the server system 142, including any parameters, variables, algorithms, instructions, rules, constraints, or references thereto. In some implementations, memory 150 stores a credentials database 152 and an associated authorized rules database 154, which can be similar to or different from credentials database 128 and authorized rules database 130. In some implementations, credentials database 152 and authorized rules database 154 can be backups of local copies that are stored at the workstations. In other implementations, one or both of the databases can be the primary copies, and the workstations 102 can remotely access the server system 142 to verify login credentials and determine applicable authorization rules.

Memory 150 can also store a workstation database 156. Workstation database 156 can store information relating to at least some of the connected workstations 102 in system 100. Workstation database 156 can record login attempts, alerts associated with a particular workstation, as well as a software version list for each overwatch application 122 and lockdown application 116 installed on each workstation 102.

A software service 146 can access the workstation database 156, and determine a status for the software installed on each connected workstation 102. In the event a workstation 102 has outdated software installed or a new version of a particular application (e.g., lockdown application 116) is available, the software service 146 can transmit the updated software to the applicable workstations 102 for installation. In this manner the software service can maintain and updated as necessary workstations 102 accessing the server system 142 that require an overwatch application 122 and lockdown application 116.

A reporting service 144 can receive alerts from workstations and identify potential security breaches. The reporting service can additionally notify appropriate systems and individuals (e.g., system administrator or security server). The reporting service 144 can identify particular individuals to notify based on the type of alert or potential security breach detected. For example, if a limited user attempts to access a secure application containing financial information that they are not authorized to access, the reporting service 144 can send a notification the appropriate person or group (e.g., security team, or authorities). In another example, if an unauthorized process is initiating on a workstation without user input, a notification can be sent to an IT support team for troubleshooting.

Figure 2:
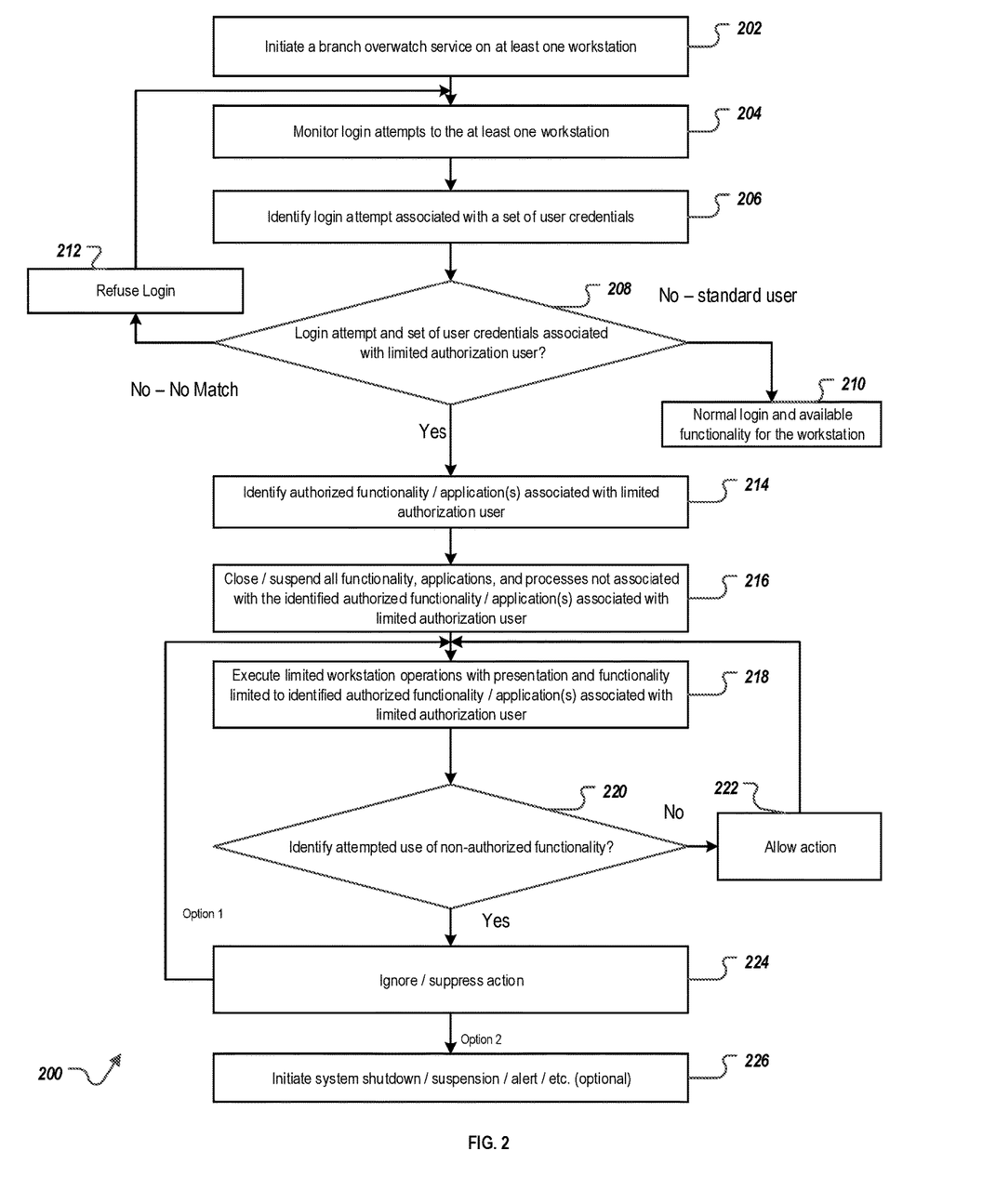
FIG. 2 is a flow diagram showing a high level process for monitoring and restricting workstation access.

FIG. 2 is a flow diagram of a high level process for controlling workstation access. FIG. 2 depicts an example method 200 and is illustrated from the point of view of a workstation, such as workstation 102 of FIG. 1. However, it will be understood that method 200 may be performed, for example by any other suitable system, environment, software, and hardware, or a combination thereof, as appropriate. In some instances, method 200 may be performed by a plurality of connected components or systems. Any suitable system(s), architecture(s), or application(s) can be used to perform the illustrated operations.

At 202, a branch overwatch service or application associated with at least one workstation is initiated. In some implementations, the branch overwatch application is initiated upon startup of a workstation and executes locally. In another implementation, the branch overwatch application is a service provided by a server system which monitors one or more workstations via a network or other remote connection.

At 204, once initiated, the branch overwatch service or application monitors login attempts at each of the at least one workstation. The overwatch service or application can operate as a background service, daemon, application, or other component, and may operate regardless of whether a user is currently logged into the workstation, as well as regardless of which user is logged into the workstation. In some implementations, the overwatch service monitors the Windows session management library, and, upon detection of a session change event, checks for a "SessionLogon" as the reason. The overwatch service can than assess a user ID of the user initiating the login. In some implementations, the overwatch service can additionally monitor for "RemoteConnect" session events in order to prevent users from bypassing the overwatch service by remotely logging in.

At 206, when a login attempt is identified and a set of user credentials are received or identified at the system, the overwatch service can read or analyze the inputted credentials to determine whether they are associated with a limited user or a fully authorized user. Credentials can be received via different manners of input and input sources. For example, a user can input a username or password using a keyboard and mouse, while in another example, credentials can be provided with an access card, which can be read via a card reader connected to the workstation and verified based on information stored on or associated with the access card. In yet another example, the workstation can obtain biometric information (e.g., fingerprint, iris image, facial recognition, etc.) associated with a user and correlate the biometric information with a previously stored set of credentials. The inputted credentials can be compared with stored credentials in a database, which may be located at the workstation, or at a remote server system that is centrally located or cloud-based.

At 208, after receiving a set of credentials, method 200 can follow one of three paths. If the received set of credentials does not match credentials stored in a credential database, at 212, the workstation can refuse to allow the login. In this case, method 200 can return to 204 and the overwatch application can continue to monitor for additional login attempts. In some instances, the user may be prompted with a message indicating a failure to verify credentials or a failed login attempt. In these instances, the user may be allowed a limited number of failed login attempts before the system locks out, ignoring further login attempts until the system has been unlocked (e.g., via a system administrator). If the set of credentials match a fully authorized user, or are not associated with a limited user, the workstation can allow normal login at 210. In these instances, the overwatch application can continue to monitor for additional login events, but otherwise take no further functionality limiting actions. The fully authorized user will be logged in and have access to full system functionality.

Returning to 208, if it is determined that the set of login credentials are associated with a limited user, then method 200 continues at 214, where a set of authorized functionality associated with the limited user is identified. In some instances, the identification of authorized functionality can be performed by a lockdown application, which may be initiated or launched by the overwatch application. The lockdown application can identify authorized software functionality (e.g., authorized applications or processes) as well as authorized hardware functionality (e.g., permitted hardware peripherals such as a keyboard or touch screen). Conversely, in some instances, the lockdown application can identify unauthorized software functionality as well as unauthorized hardware functionality.

At 216, software applications or processes that are not associated with the identified authorized functionality can be closed or terminated. Additionally, in some instances, hardware signals that are not associated with identified authorized hardware functionality may be suspended or otherwise blocked. This, in effect, places the workstation in a limited functionality mode of operation, wherein only authorized processes/applications and hardware are executing and operating. It should be noted that applications and processes required for the workstation to continue operating generally may be exempt from the present solution, or may be considered authorized for all users such that these applications and processes are not terminated.

At 218, the workstation continues to execute limited operations associated with the identified authorized functionality. In some implementations, this includes executing a third party application, which may consume the entire display of the device and offer limited options (e.g., logout, or view a particular database only). Additionally, only specific hardware inputs may be accepted that are specifically authorized for the user. For example, a keyboard may not work while the workstation is executing limited operations, or only particular keys on the keyboard may work. Additionally, the workstation may only accept inputs from a mouse, ignoring other hardware peripherals, where the mouse inputs are specifically associated with the running applications. In some implementations, the lockdown application can additionally verify that the workstation is connected to an expected network. If the workstation is not connected to the expected network, or the network changes during the login session of the limited user, the lockdown application can fully lock down (e.g., shut down or force log off) the workstation.

At 220, the lockdown application can continue to monitor for attempted use of non-authorized functionality (e.g., an unauthorized process starting, inputs at an unauthorized hardware peripheral, etc.). If an action is taken, and it is determined to be an authorized action, the lockdown application, at 222, can allow the action to proceed, and method 200 can continue to execute limited workstation operations at 218.

Returning to 220, if an unauthorized action is identified, or an attempt to use a non-authorized functionality (e.g., an unauthorized process starts or an unauthorized hardware device is connected and attempts to communicate with the workstation) is detected, method 200 can ignore or suppress the use of non-authorized functionality. Suppressing hardware inputs can, for example, include identifying the hardware input, but not passing it from an IO system to the running applications or other executing software. In some implementations, hardware inputs are intercepted using a software hook, and specific commands or inputs can be suppressed while others can be permitted.

In such instances, method 200 continues at 224, where the non-authorized action is ignored or suppressed. For example, if, while a limited user is logged in to a banking terminal or workstation, operation of a cash drawer is not authorized to the limited user, and the limited user presses an "open cash drawer" button at the workstation or attempts to execute an application or process associated with opening the cash drawer, the lockdown operation can suppress the open drawer command and prevent the cash drawer from opening. Following the command suppression, the lockdown application can continue to allow the workstation to execute limited operations, and method 200 can return to 218. In some implementations, the lockdown application can immediately shutdown or freeze the workstation, restricting further access and preventing further unauthorized actions.

Optionally, following ignoring or suppressing inputs, the lockdown application can take further actions at 226. For example, if the workstation receives a predetermined number (e.g., three) of unauthorized hardware inputs (e.g., keyboard commands) within a predetermined period of time, the lockdown application can initiate a system shutdown. Alternatively, the lockdown application can conduct a system suspension, which force logs off the limited user and may record the system state for a future security review. Additionally, the lockdown application may transmit an alert or report to a server system or other recipient in order to insure that the unauthorized activity does not go unnoticed or unaddressed.

Figure 3:
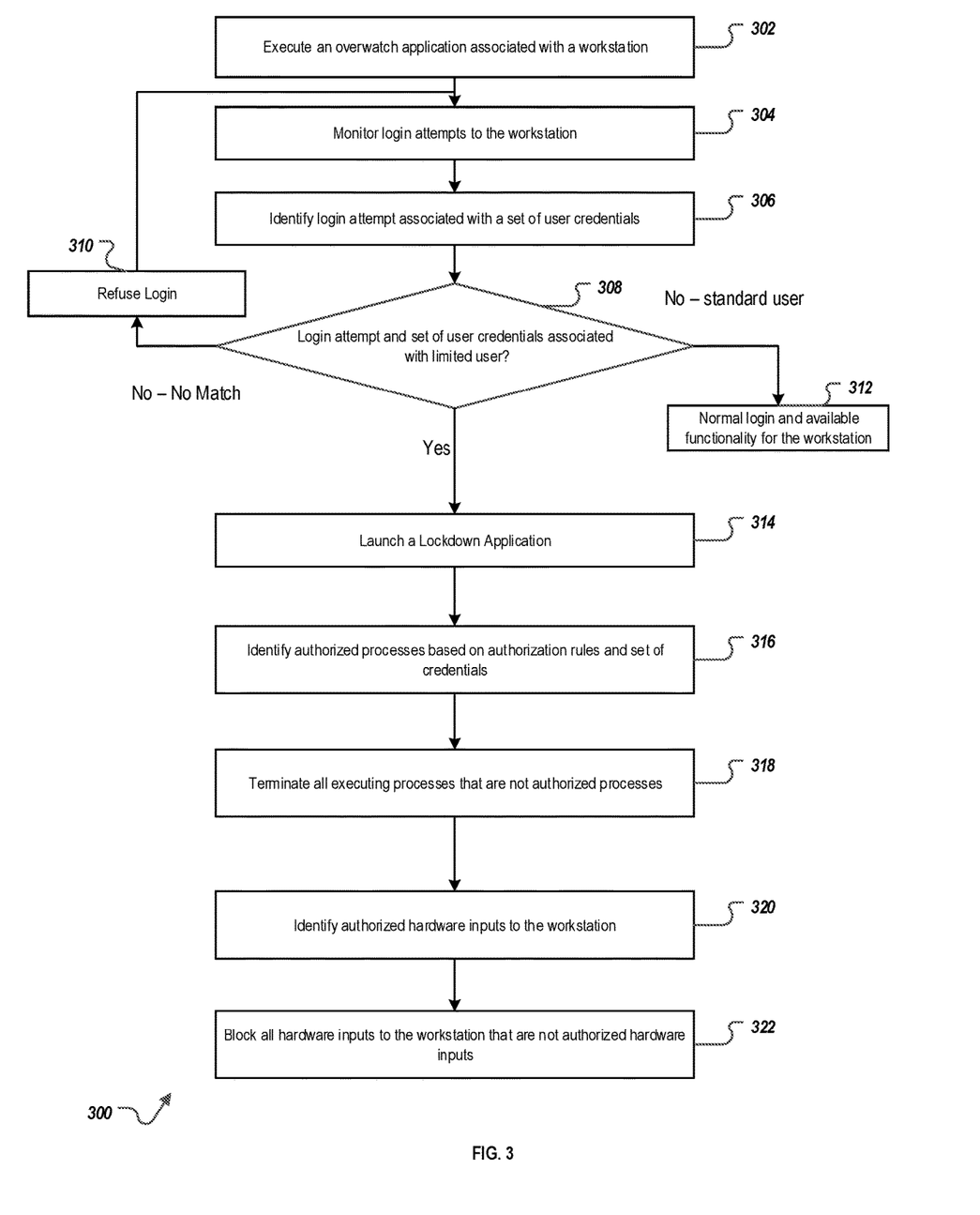
FIG. 3 is a flow diagram showing an example method for monitoring and restricting workstation access.

FIG. 3 is a flow diagram of an example method for controlling workstation access. FIG. 3 is illustrated from the point of view of a workstation, such as workstation 102 of FIG. 1. However, it will be understood that method 300 may be performed, for example by any other suitable system, environment, software, and hardware, or a combination thereof, as appropriate. In some instances, method 300 may be performed by a plurality of connected components or systems. Any suitable system(s), architecture(s), or application(s) can be used to perform the illustrated operations.

At 302, an overwatch application or process is executed to monitor at least one workstation. In some implementations, the overwatch application is initiated upon startup of, and executes locally at, a workstation. In another implementation, the branch overwatch application is a service provided by a server system which executes an agent or other process at the workstation during the workstation's operations, where the application monitors one or more workstations remotely, such as through a network connection.

At 304, the overwatch application monitors login attempts to the associated workstation or workstations. The overwatch application can operate as a background service, regardless of whether a user is currently logged into the workstation. In some instances, the overwatch application may be hidden from users, while in others, the existence of its operation may be visible to users based on an icon or notification presented within a desktop user interface. In some implementations, the overwatch service monitors the Windows session management library, and, upon detection of a session change event, checks for a "SessionLogon" as the reason. The overwatch service can than assess a user ID of the user initiating the login. In some implementations, the overwatch service can additionally monitor for "RemoteConnect" session events in order to prevent users from bypassing the overwatch service by remotely logging in.

At 306, a login attempt associated with a set of user credentials is identified. The set of user credentials can be used to determine the limits, if any, of the associated user, and allow limitations or restrictions to be applied accordingly based on the determination. Credentials can be inputted via various methods and inputs, such as those described in relation to 206 of FIG. 2. The set of credentials can be compared, for example, with previously-stored credentials available in a corresponding database that links or associates the credentials to particular user accounts and allowed or authorized functionality. That database, or set of databases, may be located locally at the workstation or at a remote server system, which may be centrally located or cloud-based.

At 308, after identifying the set of credentials, method 300 can follow one of three paths. If the received set of credentials does not match credentials stored in a credential database, at 310, the workstation can refuse to allow the login. In this case method 300 can return to 304 and the overwatch application can continue to monitor for additional login attempts. In some instances, the user may be prompted with a message indicating a failure to verify credentials, or a failed login attempt. In these instances, the user may be allowed a limited number of failed login attempts before the system locks out, ignoring further login attempts until the system has been unlocked (e.g., via a system administrator). If the set of credentials match a fully authorized user, or are not associated with a limited user, the workstation can allow normal login at 312. In these instance, the overwatch application can continue to monitor for additional login events, but otherwise take no further functionality limiting actions. The fully authorized user will be logged in and have access to full system functionality.

Returning to 308, if it is determined that the set of login credentials are associated with a limited user, then at 314, the overwatch application can launch or initiate a lockdown application in order to place the workstation in a condition of limited functionality.

At 316, the lockdown application identifies authorized functionality associated with the limited user. The lockdown application can identify authorized software functionality (e.g., authorized applications or processes) as well as authorized hardware functionality (e.g., permitted hardware peripherals such as a keyboard or touch screen). In some implementations, the lockdown application identifies unauthorized software and hardware functionality, and prohibits the identified unauthorized functionality. A limited user can be, for example, a user who requires access to a subset of the functionality of the workstation, and not the entire functionality of the workstation. For example, if the workstation is associated with a medical imaging device and stores sensitive personal information, a maintenance tech may be a limited user with access to the imaging device functionality (e.g., to perform a service on the imaging device), but may not be permitted to access the database storing the sensitive information or open a software application which can view sensitive medical images. In another example, where the workstation is associated with a bank cash register or dispenser, a limited user may be a cash recycler in charge of restocking the workstation's cash drawer or dispenser each night. The cash recycler may require access to open and close the cash drawer, but does not require access to software on the workstation for processing transactions or viewing or interacting with financial data other than the related to the cash recycling process. In such instances, the authorized functionality is limited to the limited user's needs to perform their respective role, and can ensure that the non-required applications and processes are not available, and, in some cases, are not executed or running while the limited user interacts with the system.

In some implementations, a list of authorized software processes or applications is generated, which can be referred to as a whitelist. The whitelist can include critical processes required to run the workstation (e.g., operating system software, and other core processes) as well as software required for the limited user to perform their required operations. In these implementations, the whitelist can be generated from authorization rules that are determined based on the received set of user credentials. In some implementations, the whitelist is generated and provided by a cloud-based, or remote server. In different implementations, or in the same implementation, the whitelist can be generated by a centralized server system or by the workstation itself. In an alternative instance, instead of a whitelist, the lockdown application can receive a blacklist (i.e., a list of unauthorized applications or processes). The blacklist may be referenced by the lockdown application, and any running applications or processes that are identified on the blacklist can be terminated or suspended during the login of the limited user.

At 318, executing processes that are not authorized processes are terminated. In some implementations, processes that are running that are not on the determined whitelist are terminated. In another implementation, the lockdown application searches for a running process that is on a blacklist, and, once found, terminates the matching process. This, in effect, places the workstation in a limited functionality mode of operation, where only authorized processes and/or applications execute or continue executing. In some implementations, unauthorized processes are merely suspended, or put to sleep, instead of terminated.

At 320, authorized hardware inputs are identified. Based on the authorization rules, authorized hardware functionality corresponding to the set of credentials is identified.

At 322, hardware inputs to the workstation that are not authorized are blocked or suppressed. For example, the lockdown application may identify an ALT+TAB input from a keyboard, and, instead of switching windows in response to the standard input, the input can be ignored. In another example, the lockdown application may ignore all keyboard inputs (or all but a single predefined button or type of keyboard input, such as ESC or ENTER input, if needed) when a limited user is logged in, particularly where the authorized actions allowed to the limited user do not involve or require the keyboard.

Alternatively, the lockdown application may prohibit or intercept all communication with hardware peripherals connected to the workstation. For example, the lockdown application may block communication between the workstation and one or more universal serial bus (USB) ports, preventing a user from connecting new hardware (e.g., a USB thumb drive, or USB mouse), even when that new hardware is plugged into the workstation. Similarly, communication to existing hardware connected to the workstation at the time of the login can be terminated or suspended during the interaction of the limited user. For example, the lockdown application can disconnect connected devices, sever wireless connections to particular devices, or initiate other similar operations. Still further, hardware powered by the workstation may not be powered, or the ports at which they are connected not provided power, when that connection and hardware usage is not allowed. This can include connections to printers, mice, keyboards, USB drives, monitors, particular network connections, and others.

Figure 4:
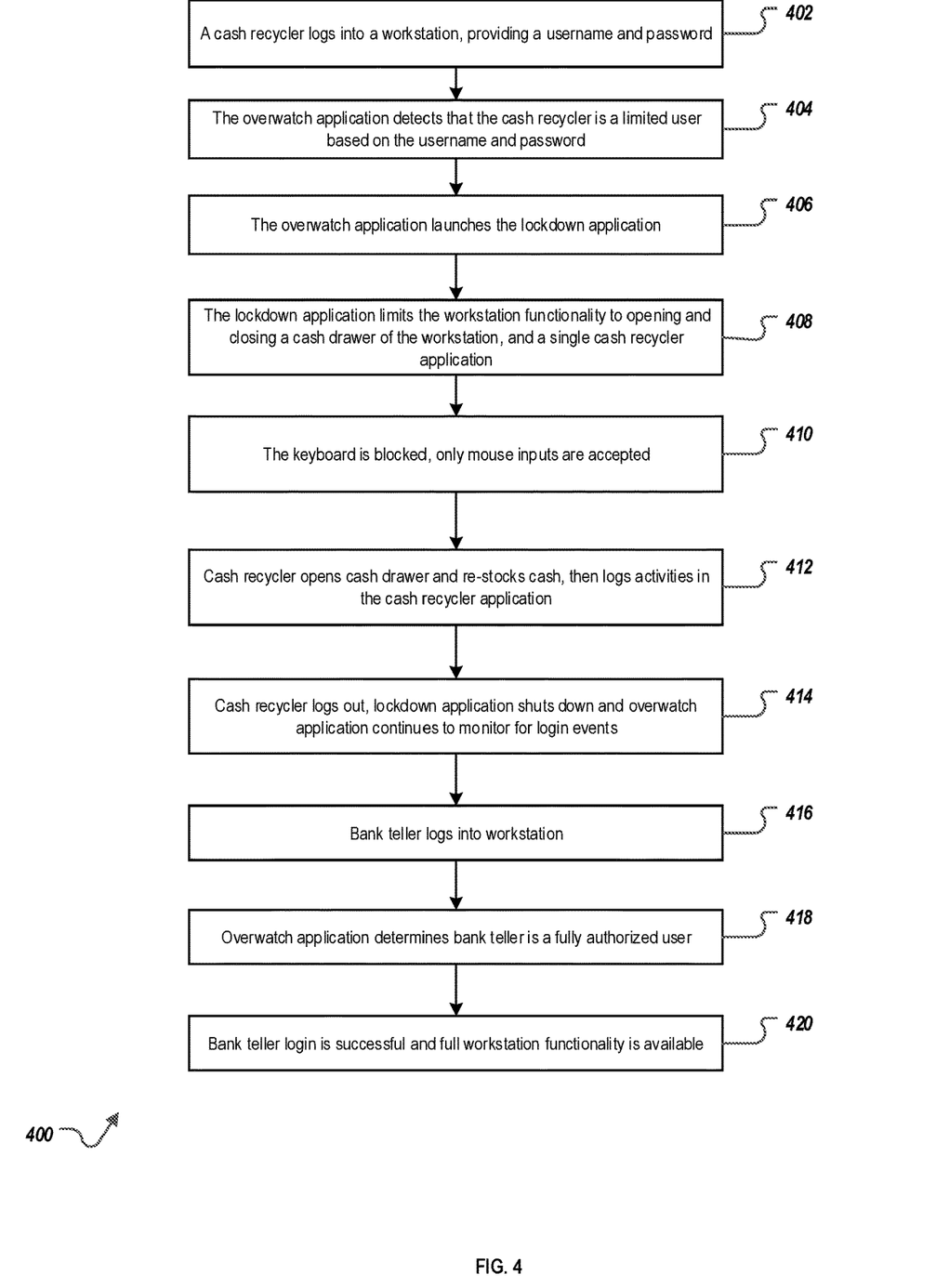
FIG. 4 is a flow diagram depicting an exemplary implementation of the method for monitoring and restricting workstation access.

FIG. 4 is a flow diagram depicting an exemplary implementation of a method for monitoring and restricting workstation access. In this instance, the method related to a cash recycler working with one or more bank teller workstations. FIG. 4 is illustrated from the point of view of a workstation, such as workstation 102 of FIG. 1. However, it will be understood that method 400 may be performed, for example by any other suitable system, environment, software, and hardware, or a combination thereof, as appropriate. In some instances, method 400 may be performed by a plurality of connected components or systems. Any suitable system(s), architecture(s), or application(s) can be used to perform the illustrated operations. It is noted that FIG. 4 contemplates one particular implementation. FIG. 4 is intended as an example, and is not meant to limit the disclosure to this particular example.

In the implementation of FIG. 4, a financial institution or bank uses workstations for tellers to process financial transactions and exchanges. The workstations can have installed and can execute software used to perform and facilitate financial transactions, such as those between accounts held by the financial institution and external institutions. In this example, each workstation may control and operate a cash drawer or dispenser, and can allow tellers to allow customers to deposit and withdraw cash in the course of their duties. Following the close of business, a cash recycler (e.g., a limited user for purposes of the description here) can access the workstations for the purpose of restocking the cash drawers or dispensers for the next day. The cash recycler may be an employee of the financial institution or third party contractor, and may have limited need or authority to interact with the workstations. In using the described solution, the financial institution can limit the allowed or authorized functionality of the workstation to which the cash recycler has access while logged in and interacting with the workstation.

At 402, the workstation detects a cash recycler logs into a workstation. The cash recycler may provide a username and password as credentials for log in. In some instances, the username and password may be specific to the cash recycler, while in others, the credentials may be generic to the cash recycler's role and/or employer (i.e., if employed by a third party). As the cash recycler only requires access to the cash drawer to perform his or her restocking actions, the system can identify the recycler and prevent access to the workstation beyond that required. In some implementations, the cash recycler may use an ID card, smart device, biometrics (e.g., fingerprint, iris scan, or facial recognition), or any other suitable method to provide credentials.

At 404, the overwatch application, which can be similar to or different from the overwatch application 122 of FIG. 1, identifies the cash recycler as a limited user based on a comparison of the received credentials and a set of stored information providing information on what and how the cash recycler can access the workstation.

At 406, based on the identification of the limited user, the overwatch application launches a lockdown application. The lockdown application can be similar to or different from the lockdown application 116 as described with reference to FIG. 1, and can be used to protect the workstation from unauthorized actions.

At 408, the lockdown application can perform operations to limit the authorized and usable functionality of the workstation in accordance with a set of predetermined authorization rules associated with the set of credentials provided by the cash recycler. In this example, the lockdown application terminates running applications that are not authorized, and can initiate a third party application specific to the cash recycler's task. For example, the cash recycler can be presented with a screen that shows three selectable icons: 1) log out, 2) open/close cash drawer, and 3) record amount deposited/withdrawn.

At 410, the keyboard and other non-mouse hardware input peripherals of the workstation are blocked by the lockdown application (e.g., using any appropriate technique), and only mouse inputs may be accepted to the workstation. The cash recycler can use the mouse to interact with the third party application by choosing one of the presented icons.

At 412, instructions or input are received, via the mouse operations, associated with the cash recycler and his or her activities, where the cash recycler is able to use the allowed and authorized functionality to open the cash drawer. The cash recycler is therefore allowed to perform the restocking operations. In some instances, the cash recycler may use the mouse and, for example, a soft keyboard displayed on the workstation's screen, to record the amount added to or removed from the cash drawer.

At 414, after the cash recycler completes their task, the workstation may receive instructions or input to log out the cash recycler from the system. Upon log out, the lockdown application can terminate, and the workstation can return to a normal, logged off state. The overwatch application can continue to run, monitoring for any future login events.

At 416, an attempted login to the workstation from a bank teller can be detected. For example, the following business day, the bank teller may come to work and log in to begin their normal duties.

At 418, the overwatch application determines the bank teller is a fully authorized user based on the credential comparison. The overwatch application can then determine that the lockdown application does not need to be initiated to limit the functionality of the workstation.

At 420, the bank teller has full access to the workstation, and can perform their duties with full access to connected hardware peripherals. For example, the bank teller may be able to operate the keyboard, mouse, microphone, headphones, cash drawer, etc. In some implementations, even the bank teller is a limited user, and the lockdown application may be initiated upon detecting the bank teller's login. However, the bank teller may be a much less limited user, and the lockdown application may restrict different functionality than what was restricted for the cash recycler, thereby allowing the bank teller to perform his or her responsibilities while protecting sensitive data and applications for which the bank teller is not authorized.

The preceding figures and accompanying description illustrate example processes and computer-implementable techniques. However, system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

The invention claimed is:

1. A system for controlling workstation access, the system comprising:
   a communications interface;
   at least one memory storing a repository of login credentials, a repository of authorization rules, and instructions;
   at least one hardware processor interoperably coupled with the at least one memory and the communications interface, the instructions instructing the at least one hardware processor to perform operations comprising:
     executing an overwatch application associated with a workstation, the overwatch application monitoring logins to the workstation;
     in response to detecting, by the overwatch application, a login initiated by a limited user, the login being associated with a set of credentials corresponding to the limited user that has access to authorized processes identified by a whitelist and a set of authorized hardware inputs of the workstation:
       initializing a lockdown application;
       identifying, by the lockdown application and based on the whitelist, based on the authorization rules, and based on the set of credentials, the authorized processes, and non-authorized processes, wherein the authorized processes comprise one or more software processes permitted to execute on the workstation during the login of the limited user, and wherein the non-authorized processes comprise one or more software processes not permitted to execute on the workstation during the login of the limited user;
       terminating, by the lockdown application, execution of the non-authorized processes;
       identifying, by the lockdown application, a set of authorized hardware inputs based on the authorization rules and the set of credentials; and
       monitoring, by the lockdown application, inputs associated with the workstation for receipt of unauthorized hardware inputs to the workstation.

2. The system of claim 1, the operations further comprising:
   in response to detecting, by the lockdown application, an unauthorized hardware input to the workstation, suppressing, by the lockdown application, the unauthorized hardware input.

3. The system of claim 1, the operations further comprising:
   in response to detecting, by the lockdown application, an attempt to initiate a process that is not an authorized process:
     transmitting, via the communications interface, an alert to a central server; and
     executing a forced logout of the limited user.

4. The system of claim 1, wherein the overwatch application and lockdown application are remotely installed on the workstation by a server system.

5. The system of claim 1, wherein the login of the limited user comprises:
receiving the set of credentials at the workstation;
transmitting, via the communications interface, the set of credentials to a server system, wherein the server system verifies the set of credentials as the set of credentials of an authorized, but limited user; and
receiving, via the communications interface, a login authorization to the workstation, wherein the login authorization comprises information associated with the authorization rules, and wherein the authorization rules are associated with the set of credentials that match stored credentials in the stored repository of login credentials.

6. The system of claim 1, wherein the limited user comprises a system user that is authorized to perform a particular set of tasks, wherein the particular set of tasks require only a subset of functionality associated with the workstation, and wherein the authorized processes correspond to the subset of functionality required by the particular set of tasks.

7. The system of claim 6, wherein the workstation is associated with a cash dispenser, and wherein the particular set of tasks comprises refilling the cash dispenser.

8. The system of claim 1, wherein, in response to detecting, by the overwatch application, the login by an authorized user, the operations further comprising:
allowing full workstation functionality to the authorized user in response to the login.

9. The system of claim 8, wherein the authorized user is a bank teller associated with the workstation.

10. The system of claim 1, wherein the hardware inputs to the workstation comprise inputs from at least one of:
a keyboard;
a mouse;
a removable memory;
a cash register;
a touchscreen; or
a microphone.

11. A non-transitory, computer-readable medium storing computer-readable instructions executable by a computer and configured to perform operations comprising:
executing an overwatch application associated with a workstation, the overwatch application monitoring log-ins to the workstation;
in response to detecting, by the overwatch application, a login initiated by a limited user, the login being associated with a set of credentials corresponding to the limited user that has access to authorized processes identified by a whitelist and a set of authorized hardware inputs of the workstation:
initializing a lockdown application;
identifying, by the lockdown application and based on the whitelist, based on the authorization rules, and based on the set of credentials, the authorized processes, and non-authorized processes, wherein the authorized processes comprise one or more software processes permitted to execute on the workstation during the login of the limited user, and wherein the non-authorized processes comprise one or more software processes not permitted to execute on the workstation during the login of the limited user;
terminating, by the lockdown application, execution of the non-authorized processes;

identifying, by the lockdown application, a set of authorized hardware inputs based on the authorization rules and the set of credentials; and
monitoring, by the lockdown application, inputs associated with the workstation for receipt of unauthorized hardware inputs to the workstation.

12. The non-transitory, computer-readable medium of claim 11, the operations further comprising:
in response to detecting, by the lockdown application, an unauthorized hardware input to the workstation, suppress, by the lockdown application, the unauthorized hardware input.

13. The non-transitory, computer-readable medium of claim 11, the operations further comprising:
in response to detecting, by the lockdown application, an attempt to initiate a process that is not an authorized process, transmitting, via a communications interface, an alert to a central server; and executing a forced logout of the limited user.

14. The non-transitory, computer-readable medium of claim 11, wherein the overwatch application and lockdown application are remotely installed on the workstation by a server system.

15. The non-transitory, computer-readable medium of claim 11, wherein the login of the limited user comprises:
receiving the set of credentials at the workstation;
transmitting, via a communications interface, the set of credentials to a server system, wherein the server system verifies the set of credentials as the set of credentials of an authorized, but limited user; and
receiving, via the communications interface, a login authorization to the workstation, wherein the login authorization comprises information associated with the authorization rules, and wherein the authorization rules are associated with the set of credentials that match stored credentials in a stored repository of login credentials.

16. The non-transitory, computer-readable medium of claim 11, wherein the limited user comprises a system user that is authorized to perform a particular set of tasks, wherein the particular set of tasks require only a subset of functionality associated with the workstation, and wherein the authorized processes correspond to the subset of functionality required by the particular set of tasks.

17. A computerized method performed by one or more processors, the method comprising:
executing an overwatch application associated with a workstation, the overwatch application monitoring log-ins to the workstation;
in response to detecting, by the overwatch application, a login initiated by a limited user, the login being associated with a set of credentials corresponding to the limited user that has access to authorized processes identified by a whitelist and a set of authorized hardware inputs of the workstation:
initializing a lockdown application;
identifying, by the lockdown application and based on the whitelist, based on the authorization rules, and based on the set of credentials, the authorized processes, and non-authorized processes, wherein the authorized processes comprise one or more software processes permitted to execute on the workstation during the login of the limited user, and wherein the non-authorized processes comprise one or more software processes not permitted to execute on the workstation during the login of the limited user;

terminating, by the lockdown application, execution of the non-authorized processes;

identifying, by the lockdown application, a set of authorized hardware inputs based on the authorization rules and the set of credentials; and monitoring, by the lockdown application, inputs associated with the workstation for receipt of unauthorized hardware inputs to the workstation.

18. The method of claim 17, further comprising:

in response to detecting, by the lockdown application, an unauthorized hardware input to the workstation:

suppressing, by the lockdown application, the unauthorized hardware input.

19. The method of claim 17, further comprising:

in response to detecting, by the lockdown application, an attempt to initiate a process that is not an authorized process:

transmitting, via a communications interface, an alert to a central server; and executing a forced logout of the limited user.

20. The method of claim 17, wherein the overwatch application and lockdown application are remotely installed on the workstation by a server system.

* * * * *